Feb. 11, 1969    J. DE LA CIERVA ET AL    3,427,504
AIRCRAFT ELECTROSTATIC DISCHARGING SYSTEM
Filed July 20, 1966    Sheet 1 of 5

INVENTORS.
JUAN de la CIERVA
ADOLF A. PERLMUTTER
DAVID B. FRASER
BY
*Bilho Kummelman & Mayerman*
ATTORNEYS.

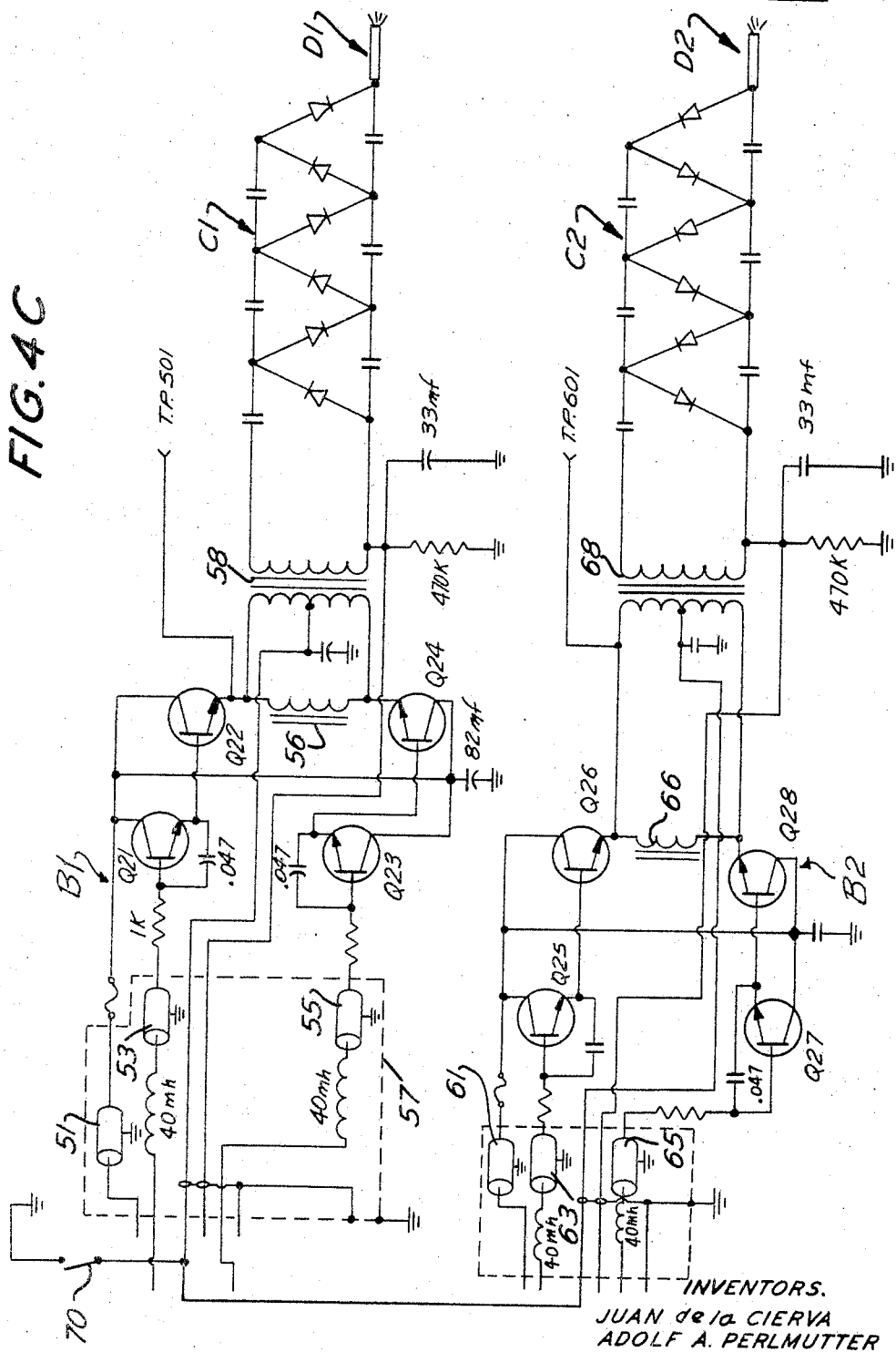

United States Patent Office 3,427,504
Patented Feb. 11, 1969

3,427,504
AIRCRAFT ELECTROSTATIC DISCHARGING SYSTEM
Juan de la Cierva, Oreland, Adolf A. Perlmutter, Drescher, and David B. Fraser, Philadelphia, Pa., assignors to Dynasciences Corporation, Blue Bell, Pa., a corporation of Pennsylvania
Filed July 20, 1966, Ser. No. 566,619
U.S. Cl. 317—2     11 Claims
Int. Cl. H05f 3/06

This invention relates to an electrostatic discharging system for aircraft, and more particularly, relates to an active system which continuously measures the potential of the aircraft with respect to its immediate environment and uses the magnitude and polarity of the potential difference to drive respective positive or negative ion generators, which, in discharging into the atmosphere reduces the electrostatic charge level on the aircraft with respect to its immediate environment within a predetermined value, for example, one (1) millijoule or less.

Obviously, one purpose of an electrostatic discharging system is to control and alleviate the effects of radio frequency interference produced by static electricity on navigation and communication systems in aircraft. Such a system is also used to prevent personnel shock hazards while helicopter aircraft, for example, is hovering. Maintaining the potential gradient between the aircraft and its environment constantly at a minimum permits the use of the aircraft in explosive or possibly inflammable environments where arcing would be caused as in the case of a charged aircraft being suddenly discharged to earth.

In an active discharging system, the discharge of the aircraft is accomplished by causing predetermined areas of the aircraft to produce corona and ion flow away from the aircraft at rates which will not affect communication and navigation systems through antennae systems. The discharging is also effected through probes or wicks rather than from propellor tips, wing tips and/or other points.

In our prior U.S. patent application Ser. No. 335,785, now Patent No. 3,260,893, there is shown discharging system for aircraft which included a rotating vane sensing device for continuously measuring with respect to the aircraft itself the polarity and magnitude of the potential of the electrostatic field immediately surrounding the aircraft. By means of a mechanical switch, slip rings on a synchronous motor, the A.C. signal from the sensor was clamped at either its most negative or positive peaks and delivered to a servo amplifier at a D.C. voltage proportional to the field with respect to the aircraft. The output of the positive or negative (±) high voltage generator actuated was then delivered through the probe or wick points so as to cause an appropriate ± ion current to be discharged into the atmosphere whereby the potential gradient between the aircraft frame and its environmental field would be reduced to a predetermined level (below one millijoule) and thus enable the aircraft to be maintained constantly at substantially the same potential level as its environs. This was true regardless as to whether the aircraft was in a charged cloud or at ground level.

It is an object of the present invention to eliminate the mechanical slip ring switch, which is extremely sensitive to variable contact resistance and wear, and to construct a pure electrical switch for clamping the A.C. signal with respect to a fixed D.C. reference.

Another object of this invention is to provide a means for sampling detection of the A.C. signal rather than a continuous measurement of a modulated D.C. level.

Another object of this invention is to provide a sensing head construction of diminished size and increased sensitivity.

Still another object of this invention is to operate the discharging system at a higher frequency thereby reducing size of capacitors and transformers while providing less ripple in the output.

Yet another object of this invention is to provide a fail-safe system coupled with the discharger to indicate when the aircraft is operating at a charge in excess of a preset safe level for the prescribed aircraft.

A still further object of this invention is to provide a fail-safe indicator for detecting any failure in the mechanical and/or electrical components of the electrostatic discharging system.

Yet a further object of this invention is to provide a housing for the high voltage generator which will eliminate high voltage breakdown as a result of moisture and water film conditions.

Still another object of this invention is to provide a means to reduce wear on probe tips as a result of air currents and velocity.

Other objects of this invention are to provide an improved device of the character described, which is sturdy in construction, which is easily and economically produced and which is highly efficient and effective in operation.

With the above and related objects in view, this invention consists of the details of construction and combination of parts as will be more fully understood from the following detailed description when read in conjunction with the following drawing, in which.

Figure 4A:
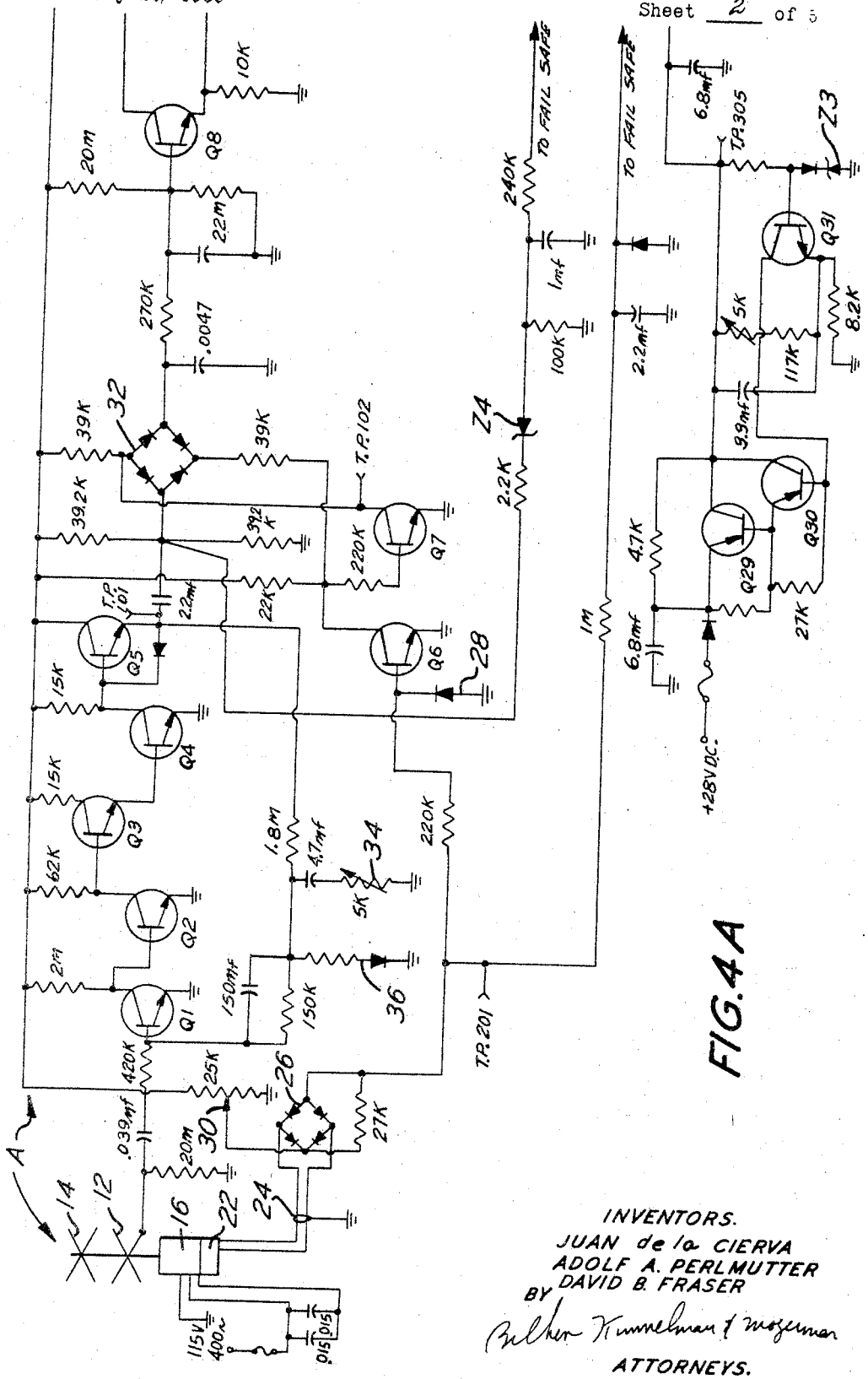
Figure 4B:
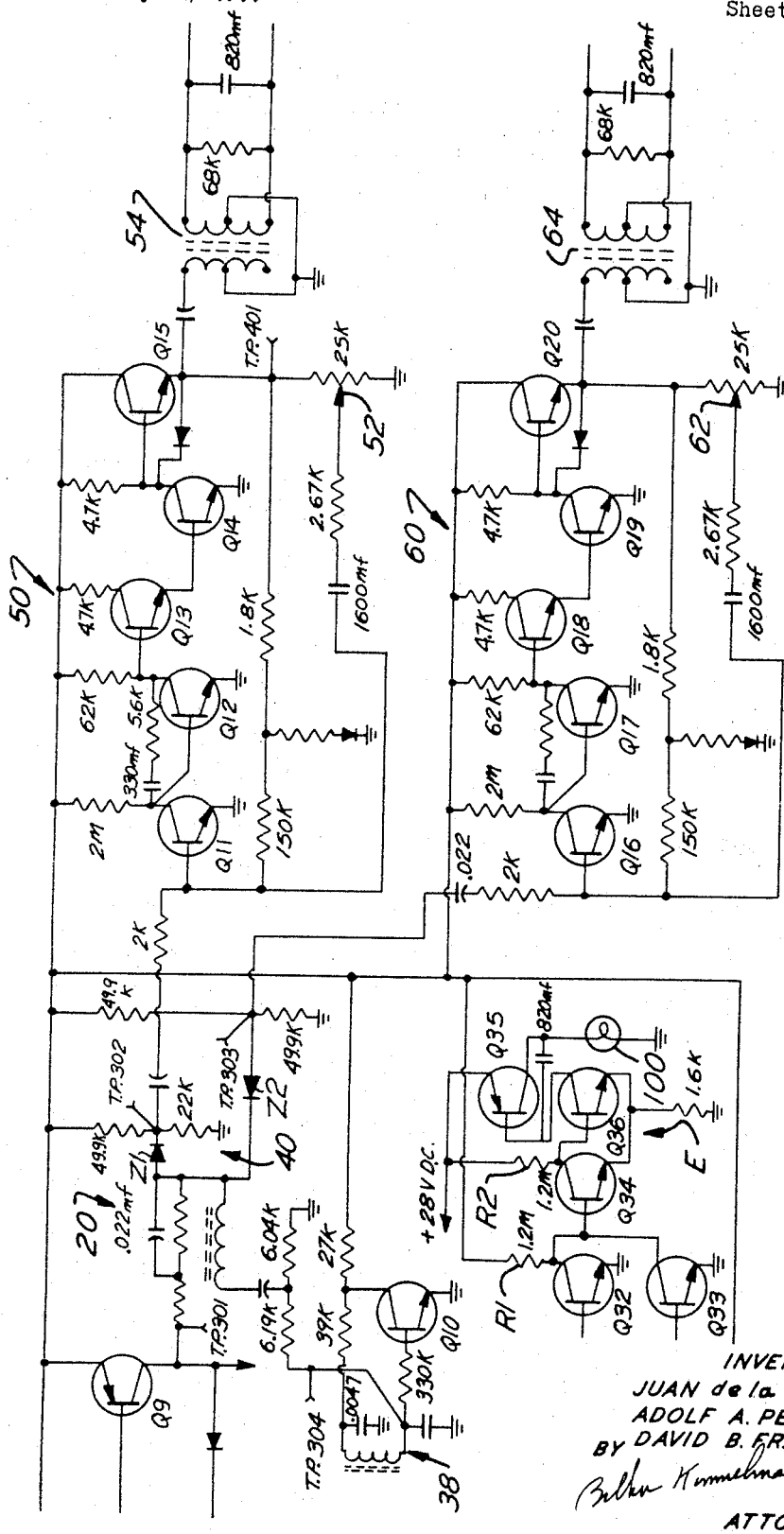

FIGURES 4A–4C are schematic diagrams of the electrical circuiting of the electrostatic discharging system; FIGURE 4A showing the the sensor module and amplifier and including the power supply circuit; FIGURE 4B showing the positive and negative high voltage amplifiers and the fail-safe system; and FIGURE 4C showing the high voltage exciters and multiplier circuits.

Figure 5:
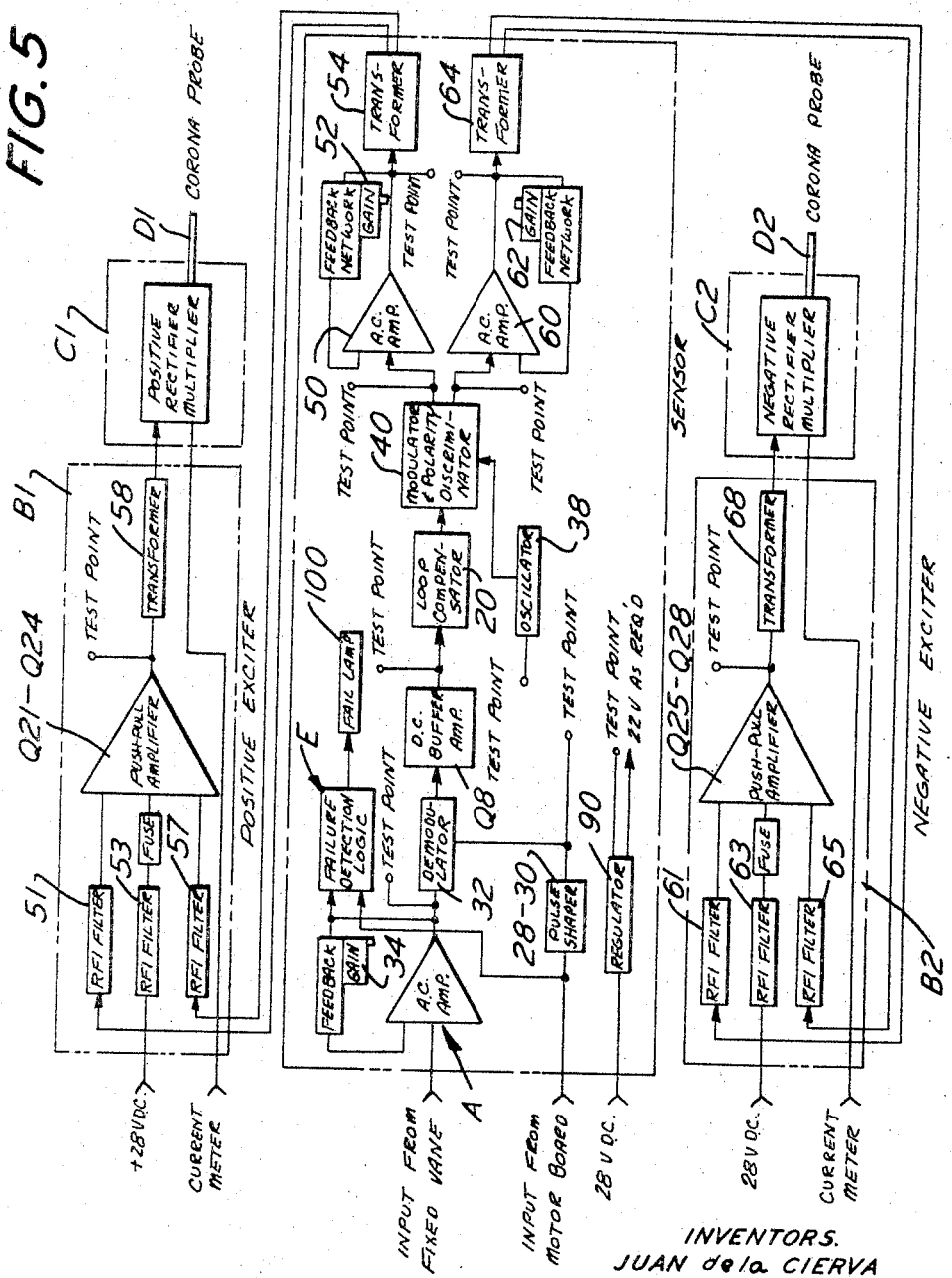

FIGURE 5 is a block diagram of the control system.

Figure 6:
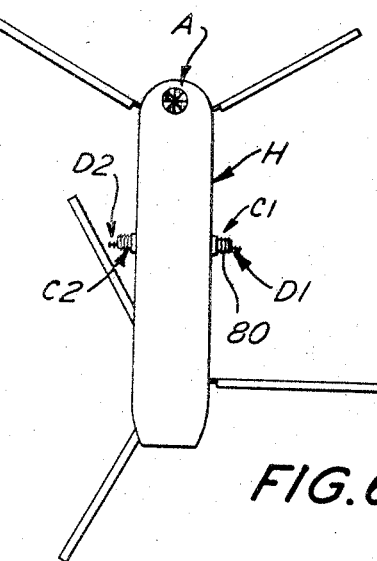

FIGURE 6 is a bottom plan view of a helicopter aircraft having the electrostatic discharging system embodying this invention.

Referring now in greater detail, to the drawings in which similar reference characters refer to similar parts, the instant invention is basically a closed-loop servo-control system in which the output is a D.C. current of positive or negative polarity. As shown in the block diagram of FIGURE 5, which indicates the order of elements in the control loop, the control system comprises a sensor mechanism generally designated as A, which detects the polarity and amplitude of the electrostatic field about the aircraft with respect to the aircraft itself. The output of the sensor A actuates parallel circuits, one of which conducts on positive signals and the other on negative signals, each circuit amplifying its specific signal to a level sufficient to drive its own high voltage exciter B1 or B2. The respective exciter circuits B1 and B2, each of which consists of a double stage of power amplification, then further excite an output transformer which drives its corresponding high voltage multiplier unit C1 or C2 so as to discharge current from wick probes D attached thereto into the atmosphere. Also included as a basic component of the instant invention is a fail-safe circuit E which monitors and indicates any failure in the electrical or mechanical conditions within the sensor A or if the signal transmitted by the sensor and subsequent components should exceed a predetermined level so as to result possibly in an aircraft potential above the maximum capabilities of an operative circuit. The fail-safe detector E will also provide indication when failure occurs in the power supply system. In effect, the fail-safe logic circuits E of the present invention detects a charge level in excess of the preset safe level for the prescribed aircraft of where the aircraft potential exceeds that maximum limit of an operative circuit.

Referring to FIGURE 4A, the sensor A includes a head consisting of a fixed vane assembly 12 in the form of the bottom of a can having four equally-spaced octants cut out and a four-bladed rotatable vane 14. The fixed vane 12 thus is in the shape of four 45° segments which are located outside the aircraft F and substantially flush with its skin but insulated therefrom. The can of the fixed vane 12 may be mounted anywhere upon the aircraft and contains all of the low voltage circuitry. The rotary vane 14 is driven by a motor 16 so as to alternately expose and then shield the fixed vane to the electrostatic field immediately surrounding the aircraft. Hence, the rotary vane 14 acts as a chopper converting the aircraft surface charge into a pulsed current which is easily amplified. Use of a four-bladed sensor head rather than the two-bladed vane shown in the prior patent application 335,785, reduces the size and ripple voltage and increases sensitivity. The rotating vane 14 is grounded and is turned at approximately 12,000 r.p.m. by the motor 16.

The A.C. output of the sensor (from fixed blade 12) is fed into a high gain A.C. amplifier 18 consisting of five transistors Q1 to Q5, Type 2N929, which provide approximately 10,000 gain. Accordingly, the input amplifier 18 amplifies the output from the sensor mechanism and supplies an output signal of sufficient amplitude to actuate compensator 20 and exciters B1 and B2 subsequent thereto. The input amplifier 18 also provides the system gain control and feedback network for controlling system stability. In addition, the amplifier stage 18 demodulates the chopped signal generated by the sensor as follows:

The motor 16 also drives an alternator 22 which provides an 800 c.p.s. chopper signal for use in the phase detection portion of the demodulator circuit. A full wave diode bridge rectifier 26 delivers an 800 cycle negative D.C. reference output whose most positive portion is adjusted by potentiometer 30. All diodes are Type 1N3728 unless otherwise specified in the specification or drawings. Similarly, all transistors are Type 2N929 unless otherwise specified. The negative D.C. output of the bridge 26 is clipped at 0.7 volt by reverse bias diode 28, the D.C. width and level being adjusted by potentiometer 30. The peaks of the 800 cycle D.C. are amplified by a pair of 2N3390 transistors Q6 and Q7 and are then applied to the pulse box car detector 32 in synchronization with the amplified signal from the sensor 12–14. That is, the 800 c.p.s. amplified peaks delivered by the alternator are fed across the detector bridge 32 and operate as an electrical switch in synchronization with the A.C. modulated signal from the sensor whereby plus or minus pulses approximately 125 microseconds long will pass through at a D.C. level proportional to the electrostatic field surrounding the aircraft.

Gain control potentiometer 34 affords adjustment in feedback so as to secure control system stability, and diode-resistor network 36 provides temperature compensation. Thus, the amplifier stage demodulates the chopped signal generated by the sensor mechanism and samples the signal at an 800 c.p.s. rate. Transistors Q8 and Q9 (2N3136) are hooked up as emitter-followers and act as a D.C. buffer amplifier with a gain of 1.

The compensator 20 is used to modify the output signal of the input amplifier in such a way as to take into account the dynamic characteristics of the aircraft and the high voltage generators. That is, the capacitor network peaks the signal since the high voltage generator cannot follow the high frequency but would lag behind. Hence, by peaking the signal we emphasize the high frequencies so as to make the high voltage generator respond more rapidly. The output of the compensator is then used to modulate an A.C. carrier generated by a local oscillator which is then fed into either of the two power amplifiers.

Referring to FIGURE 4B, the positive or negative D.C. levels which are above or below a D.C. reference level, and which correspond to the aircraft voltage, are used to modulate an oscillator 38 and are delivered to polarity discriminator network 40 which includes a pair of opposed diodes Z1 and Z2. Positive signals pass through the upper diode Z1 whereas negative signals pass through the lower diode Z2. The positive or negative signals carry the 1750 c.p.s. signal of the local oscillator 38 embodying transistor Q10. The A.C. is mixed with the signal and fed into respective positive or negative parallel power amplifiers 50 or 60. In the amplifiers 50 and 60, the signal is amplified to a sufficient level to drive the exciters B1 or B2, and these stages each contain the output gain control which determines the amount of high voltage the system will generate. The positive power amplifier 50 includes four stages of amplification Q11, Q12, Q13 and Q14 together with feedback from Q15. The negative power amplifier is identical, with transistors Q16, Q17, Q18, Q19 and Q20. Suitable gain control potentiometers 52 and 62 are included within each circuit.

The diodes Z1 and Z2 are used as current controlled resistors and allow coupling of the 1750 c.p.s. signal into either of the two amplifiers 50 and 60, by merely charging the D.C. bias current to the diodes. This greatly simplifies the processing of the control signal and its separation into the appropriate polarity channel.

The output of the A.C. power amplifier 50 is fed into transformer 54 which drives the positive exciter B1. The output of the A.C. power amplifier 60 is delivered to transformer 64 which drives the negative exciter B2. Referring now to FIGURE 4C, the exciters B1 and B2 each consist of a double stage of power amplification. Exciter B1 includes a Type 2N1711 transistor Q21 which is coupled as an emitter-follower with a Type STC1943 transistor Q22 and identically, transistor Q23 is connected as an emitter-follower with Q24, this being a Darlington connection which provides current amplification without voltage amplification. Q22 and Q24 are coupled in Class B push-pull across choke 56 and transformer 58. RF filters 51, 53 and 55 shield the various input leads to the exciter transistors Q21 and Q23 and grounded casing 57 encapsulates the same to diminish the effect of current surges upon radio interference. In a precisely identical manner, the parallel negative B2 exciter embodies transistors Q25, Q26, Q27 and Q28 driving transformer 68 and resonant choke 66. Radio frequency filters 61, 63, 65 and 67 also shield the negative exciter lead-ins. Landing switch 70 serves to de-energize the high voltage circuits when the aircraft is on the ground, this action taking place automatically. The chokes 56 and 66 are placed in parallel with the respective transformer primaries and are used to resonate the reflected capacity of the secondary. Alternatively, the same can be accomplished by a self-resonant transformer which reduces drastically the power required for the system. Such self-resonant transformers (58 and 68) operate at unity power factor at 1750 c.p.s., most unusual for such a high turns ratio.

The multiplier units C1 and C2, one each for positive and negative output currents, consist of multistage doubler circuits which rectify and step up the voltage output of the exciters to approximately 100,000 volts. The multipliers each comprise a capacitor diode network, as set forth in FIGURE 4C, arranged in a diagonal ladder cascade. That is, each cascade of diode-capacitors constitutes a doubler network. Current is discharged into the atmosphere from the probes or wicks D connected to the multipliers C1 and C2. Avalanche controlled rectifiers are used in the high voltage generators. Thus, increasing reliability by providing burn-out protection for the diodes in the event of an overdrive signal due to transient conditions.

Figure 1:
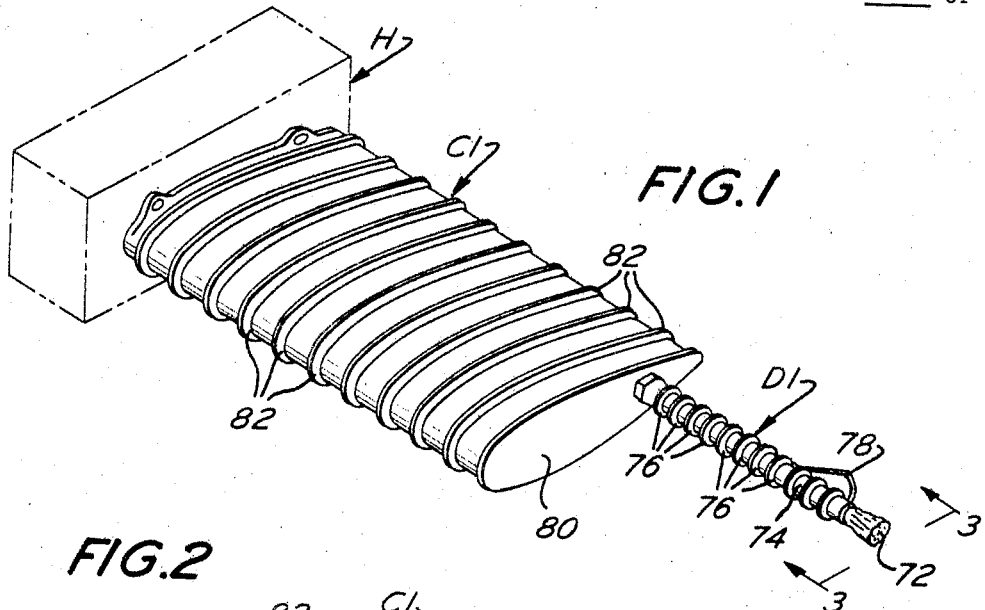
FIGURE 1 is a perspective view of an aircraft electrostatic discharging system embodying this invention.
Figure 2:
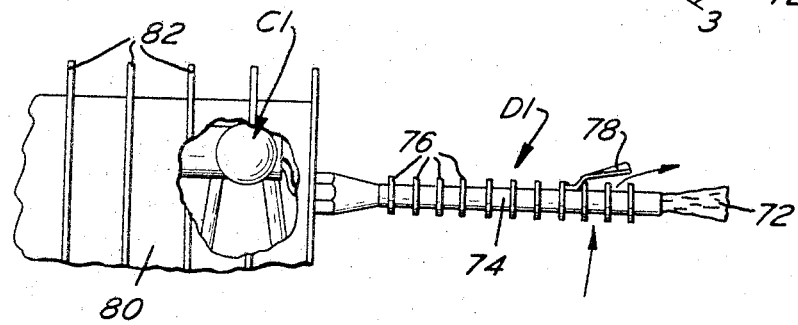
FIGURE 2 is a top elevational view, and partly broken away, of a high voltage probe and mount embodied in the discharging system.
Figure 3:
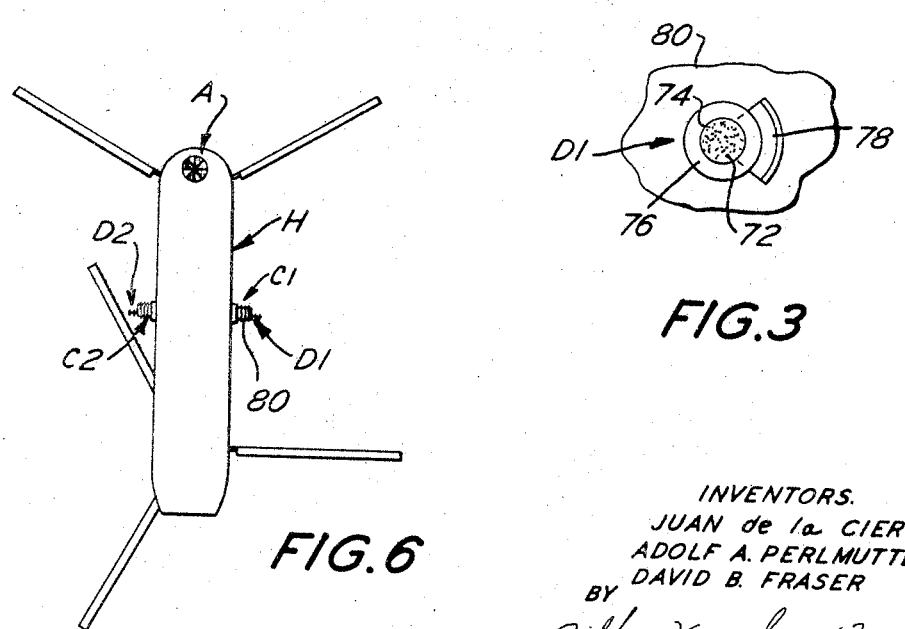
FIGURE 3 is a sectional view taken along lines 3—3 of FIGURE 1.

Referring now to FIGURES 1, 2 and 3, the probes D, the wicks of which are electrically insulated from the aircraft itself, conveniently conduct the output current to a dissipation point so that the corona current may be suitably discharged. Each probe is a conductive bundle of fibers 72 contained within a protective insulative plastic tube 74, such as fiberglass, cut to such a length that approprimately one inch of fiber protrudes from the tube. The outside of the tube 74 contains a plurality of longitudinally spaced ribs 76 which are circular in cross-section. These ribs 74 act as fences for breaking up any possible water film, which might collect on the surface of the tube 74 and conduct the high voltage discharge back upon the aircraft skin. A wind deflector 78 in the shape of a spoon extends angularly from the rear edge of the tube 74 and directs an air current against the rear of the fiber bundle 72 and maintains it in an axial outboard direction. That is, the normal airflow resulting from the forward direction of the aircraft would bend the wick 72 backwardly and tend to cause wear. The spoon 78 thereby deflects the air and straightens out the wick 72. The inboard end of the tube 74 is coupled by insulator nuts 79 to a housing 80 which encases the multipliers C1 and C2. The casings 80 are usually mounted on opposite sides of the aircraft structure and perpendicular to the surface thereof. In a helicopter, for example, the units are located in such a position that they are subject to maximum downwash of the main rotor blades. The casings 80 are of airfoil design to contribute minimum drag and also have a series of axially spaced circumferential fins or fences 82 to break up moisture or water film which would act like a conductor at the high voltage operation. Finally, a Teflon spray is applied to the surface of the fiberglass housings 80 to act as a conditioner for dispersing any water film.

The power supply circuit comprises a D.C. regulator 90, including transistors Q29, Q30, Q31 and Zener diode Z3, which takes the 24- to 30-volt, nominal 28 volts, aircraft supply voltage and delivers a regulated 22-volt D.C. to components as indicated. 22-volt regulated D.C. is used as a reference level for the collectors of transistors Q32 and Q33 of the fail-safe system E and to the base of Q34. Unregulated 28 volts D.C. is delivered to the remainder of the fail-safe circuit E and to the exciters B1 to B2.

The fail-safe circuit E including its indicating lamp 100 is best shown in FIGURE 4B. It comprises two gates Q32 and Q33, emitter coupled Schmitt trigger Q34 and Q36, and a switch Q35. Q35 functions as a transistor "on-off" switch, and when everything is functioning well (motor 16 operative, 22 volts regulated D.C. operative, and signal within limit) is biased "off". No current will flow through lamp 100. Q35 is similarly biased in "off" position; Q34 is normally "on" and current will flow through resistor R2. Of course, if the 28-volt D.C. line should fail, the fail-safe lamp 100 would not go "on" since there would be no power at all in the circuit. However, if the 22 volts regulated should fail, Q34 will be driven to a non-conductive state, and hence Q36 will conduct so as to cause current to flow through the collector circuit of Q35. Accordingly, lamp 100 will conduct and indicate "on".

If the motor 16 should fail, the alternator 22 will no longer generate so that the negative D.C. output from the bridge rectifier 26 ceases. Therefore, transistor Q33 will change from "off" to conducting condition. Current would be diverted from Q34 to Q33 and again cut off Q34. The next sequence would be conduction of Q36 with attendant conduction of Q35 so that lamp 100 would again be activated.

Lastly, if the signal delivered to the detector 32 is too large the D.C. pips emerging therefrom will be large. Zener diode 24 accordingly will break down and cause conduction in the base circuit of Q32. Again, transistor Q32 conducts and biases Q34 to "off." Q36 and Q35 also now conduct and lamp 100 is similarly energized.

It is apparent from the foregoing that the fail-safe circuit E and its lamp 100 are embodied in the discharger for the purpose of indicating either that the system is not operating correctly or that the system is operating in a saturated condition—i.e. the electrostatic charge on the aircraft H is above the safe limit. The fail-safe circuit E thus monitors the output of the sensor input amplifier to determine whether the signal is too large. Too large a signal indication could result from any failure of system components subsequent to the detector 32 including power output circuits 50 and 60, exciters B1 and B2, multipliers C1 and C2, probes D1 and D2 or any interconnecting wiring. However, if a saturated condition exists purely as a result of an extraordinary charging environment, the lamp 100 will light during saturation but will go out within a short time. Failure in the regulated power supply 90 as by short or open circuiting of any electronic components would change the D.C. bias on transistor Q34. Mechanical motor failure would also cause Q33 to conduct so that system performance will always be detected on a "go-no-go" basis.

The system always actively maintains the aircraft in flight in such an electrostatic charge condition that the total energy on the aircraft is one (1) millijoule or less (with the respect to its immediate environment).

In passing, it appears worthwhile to mention that the probes D1 and D2 may include means for assisting the discharge current with a radioactive discharge. In such a case, the probes might comprise a solid carbon rod mounted within a Teflon tube. Metal needles (for example, tungsten or steel) coated with a small amount of radioactive material (Radium 226) would be attached to the extremities of the carbon rods. The radioactive discharge would ionize the area immediately adjacent the probe tips, hence decreasing the effective air impedance with consequent increase in discharging current capability for a given applied voltage.

Although this invention has been described in considerable detail, such description is intended as being illustrative rather than limiting, since the invention may be variously embodied, and the scope of the invention is to be determined as claimed.

What is claimed is:

1. An automatic electrostatic discharging system for aircraft comprising a rotary vane sensing head for continuously measuring the electrostatic field about the aircraft with respect to the aircraft and having an A.C. signal output proportional to the field being measured, an alternator rotatable with the rotary vane of said sensing head and having an A.C. output, means to rectify and clip the A.C. output of said alternator and deliver a D.C. output of a predetermined level, means to amplify the A.C. signal output of said sensing head, means to rectify the amplified A.C. signal and clamp therewith the D.C. output whereby the sum will be a sampled D.C. signal having a polarity and magnitude proportional to the electrostatic field with respect to the aircraft, a positive high voltage generator, a negative high voltage generator, a positive exciter network, a negative exciter network, a probe head associated with each of said high voltage generator means, and a polarity discriminator separating the D.C. signal and delivering to the respective positive and negative exciter networks a corresponding signal proportional to the magnitude of the field surrounding the aircraft whereby a current will be discharged from the probes sufficient to maintain the aircraft with respect to its environs always less than one millijoule.

2. The invention of claim 1 wherein the means to rectify and clip the output of said alternator comprises a full wave diode bridge, and adjustable reverse-bias diode.

3. The invention of claim 1 including a fail-safe indicating circuit coupled with the output of said alternator and with the output of said means to amplify the amplified A.C. signal output whereby charge levels in excess of a preset safe level for the aircraft and failures of the electrostatic discharging system itself will be indicated.

4. The invention of claim 3 wherein said fail-safe indicating circuit comprises a transistor switch having its collector coupled to a lamp, an emitter coupler multi-vibrator loop including a first transistor and a second transistor biased to "off" when said first transistor is "on" and to "on" when said first transistor is "off", the transistor switch being conductive only when said second transistor is "on" and transistor network means coupled to the output of said alternator and of said means to amplify the A.C. signal and normally biased to "off" position when each of said outputs is within a predetermined level biasing the first transistor to "on" position.

5. Apparatus for electrically discharging aircraft comprising a high voltage circuit network supported on the exterior of the aircraft, an insulative housing encasing said high voltage network, and a probe outwardly projecting from said housing, said probe including a conductive wick and an insulative tube, said wick being electrically coupled to said high voltage network and having a portion extending beyond said tube and being adapted to discharge a current into the atmosphere when said high voltage network is excited, and tube having a plurality of axially spaced ribs having relatively sharp edges on the exterior surface thereof and acting to break up continuity of any moisture films collecting upon said probe whereby current discharge upon the aircraft skin will be prevented through the relatively conductive water film.

6. The invention of claim 5 including a plurality of spaced fins on said housing in generally parallel disposition with the ribs on said tube and adapted to break up continuity of moisture films upon said housing.

7. The invention of claim 6 including a conditioner coated upon the exterior of said housing for dispersing coagulating moisture in discrete droplets.

8. The invention of claim 5 including a spoon adjacent the outboard trailing edge of said probe and deflecting a portion of the air current in a direction opposing the travel of the aircraft so that the wick will be maintained in extended disposition.

9. The invention of claim 5 including radioactive means on the outboard end of said probe and providing an ionized area adjacent the discharging portion of the probe whereby the effective impedance of the air is decreased so as to increase the discharging current capability for a given applied voltage.

10. The invention of claim 5 wherein said high voltage network includes avalanche controlled rectifiers to provide burn-out protection therefor.

11. The invention of claim 10 including self-resonating transformer means coupled to the input of said high voltage network.

References Cited

UNITED STATES PATENTS 3,260,893   7/1966   De La Ciervaetal _____ 317—2

LEE T. HIX, *Primary Examiner.*

U.S. Cl. X.R.

244—1; 321—8, 15; 323—22; 340—27